US009791706B2

(12) United States Patent
Ranieri et al.

(10) Patent No.: US 9,791,706 B2
(45) Date of Patent: Oct. 17, 2017

(54) MUTLI-LAYER PLENOPTIC DISPLAYS THAT COMBINE MULTIPLE EMISSIVE AND LIGHT MODULATING PLANES

(71) Applicant: DISNEY ENTERPRISES, INC., Burbank, CA (US)

(72) Inventors: Nicola V. Ranieri, Ennenda (CH); Simon Heinzle, Zurich (CH); Peter C. Barnum, Dallas, TX (US); Wojciech Matusik, Lexington, MA (US); Marcus Gross, Lister (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 427 days.

(21) Appl. No.: 14/151,543

(22) Filed: Jan. 9, 2014

(65) Prior Publication Data
US 2014/0125894 A1 May 8, 2014

Related U.S. Application Data

(63) Continuation of application No. 13/184,693, filed on Jul. 18, 2011, now Pat. No. 8,643,684.
(Continued)

(51) Int. Cl.
G09G 5/02 (2006.01)
G02B 27/22 (2006.01)
H04N 13/04 (2006.01)

(52) U.S. Cl.
CPC ..... *G02B 27/2214* (2013.01); *G02B 27/2278* (2013.01); *H04N 13/0409* (2013.01);
(Continued)

(58) Field of Classification Search
CPC ................ G09G 3/36; H04N 13/0443; H04N 13/130447; H04N 13/0459
(Continued)

(56) References Cited

U.S. PATENT DOCUMENTS 725,567 A 4/1903 Ives
5,745,197 A 4/1998 Leung et al.
(Continued)

OTHER PUBLICATIONS

Akeley, Kurt, et al., "A Stereo Display Prototype with Multiple Focal Distances," ACM Transactions on graphics 23, 3 (Aug. 2004), 804-813.
(Continued)

*Primary Examiner* — William Boddie
*Assistant Examiner* — Leonid Shapiro
(74) *Attorney, Agent, or Firm* — Marsh Fischmann & Breyfogle LLP; Kent A. Lembke

(57) ABSTRACT

A multi-planar plenoptic display assembly is provided that includes multiple spatially-varying light emitting and light modulating planes. The display assembly includes at least one light emitting device and may include, but does not require, a modulating device used in conjunction according to display methods taught herein to display light field data. A display assembly controller may be used to render a light field with depth into a multi-planar plenoptic display assembly by assigning decomposed portions of the light field to the display assembly for display or presentation by differing ones of the emitting elements and by operating a modulating device to provide a parallax barrier. In one embodiment, a dynamic parallax barrier and a number of bi-state screens. Another embodiment uses a beam splitter to co-locate two pairs of autostereoscopic displays each including a projector projecting 3D content, a parallax barrier, and an emissive/projector element.

19 Claims, 8 Drawing Sheets

Related U.S. Application Data

(60) Provisional application No. 61/433,966, filed on Jan. 18, 2011.

(52) U.S. Cl.
CPC ..... *H04N 13/0443* (2013.01); *H04N 13/0447* (2013.01); *H04N 13/0459* (2013.01)

(58) Field of Classification Search
USPC ....................................... 345/694, 690, 87, 6
See application file for complete search history.

(56) References Cited

U.S. PATENT DOCUMENTS

| | | | | |
|---|---|---|---|---|
| 5,777,720 | A * | 7/1998 | Shapiro | G02B 27/0093 348/E13.022 |
| 5,813,742 | A | 9/1998 | Gold et al. | |
| 6,124,920 | A | 9/2000 | Moseley et al. | |
| 6,359,618 | B1 * | 3/2002 | Heirich | G06T 15/04 345/426 |
| 7,180,478 | B2 * | 2/2007 | Hamagishi | G02B 27/2214 345/32 |
| 2009/0038536 | A1 * | 2/2009 | Taniguchi | C30B 13/24 117/7 |
| 2010/0265284 | A1 * | 10/2010 | Satou | G09G 3/003 345/697 |
| 2011/0019056 | A1 | 1/2011 | Hirsch et al. | |
| 2011/0157330 | A1 * | 6/2011 | Bennett | G06F 3/14 348/54 |
| 2012/0007559 | A1 * | 1/2012 | Schwartz | H02J 7/0016 320/119 |
| 2012/0081524 | A1 * | 4/2012 | Joseph | H04N 13/0239 348/51 |
| 2012/0140131 | A1 * | 6/2012 | Lanman | G02B 27/2214 349/15 |

OTHER PUBLICATIONS

Annen T., et al., "Distributed Rendering for Multiview Parallax Displays," In Stereoscopic Displays and Applications, Proceedings of SPIE vol. 6055, 2006.
Barnum, Peter C., et al., "A Multi-Layered Display with Water Drops," In SIGGRAPH, 2010.
Bell, Gareth P., et al., "Beyond Flat Panels-Multi Layer Displays with Real Depth," In SID Symposium Digest of Technical Papers, 39, 1, 2008, 352-355.
Cossairt, Oliver S., et al., "Occlusion-capable multiview volumetric three-dimensional display," Applied Optics, vol. 46, No. 8, Mar. 10, 2007.
Durand, Fredo, et al., "A Frequency Analysis of Light Transport," In SIGGRAPH, 2005.
Gross, Markus, "blue-c: A Spatially Immersive Display and 3D Video Portal for Telepresence," In ACM Transactions on Graphics, 2003.
Hirsch, Matthew, "BiDi Screen: A Thin, Depth-Sensing LCD for 3D Interaction using Light Fields," 2009, in ACM Transactions on Graphics.
Jacobs, Adrian, et al., "2D/3D Switchable Displays," 2003, Sharp technical Journal, 4, 15-18.
Jones, Andrew, et al., "Rendering for an Interactive 360 degree Light Field Display," 2007, ACM Transactions on Graphics 26, 3 (July), 40:1-40:10.
Kim, Yunhee, et al., "Point light source integral imaging with improved resolution and viewing angle by the use of electrically movable pinhole array," Dec. 24, 2007, vol. 15, No. 26, Optics Express, 18253-18267.
Lanman, Douglas, "Content-Adaptive Parallax Barriers: Optimizing Dual-Layer 3D Displays using Low-Rank Light Field Factorization," ACM transactions on Graphics, vol. 29, No. 6, Article 163, Dec. 2010.
Levin, Anat, et al., "Linear view Synthesis Using a Dimensionality Gap Light Field Prior," in CVPR, 1831-1838, 2010.
Levin, Anat, et al., "Understanding camera trade-offs through a Bayesian analysis of light field projections," in ECCV, 2008.
Perlin, Ken, et al., "An Autostereoscopic Display," SIGGRAPH 2000, Computer Graphics Proceedings, Annual conference Series, 319-326.
Peterka, Tom, et al., "Advances in the Dynallax Solid-State Dynamic Parallax Barrier Autostereoscopic Visualization Display System," IEEE transactions on Visualization and Computer graphics, Manuscript ID, 14, 3 (May/Jun. 2008), 487-499.
Spagno, Christian, "Immersive VR Projection System with Simultaneous Image Acquisition Using Active Projection Screens," Master's thesis, Swiss Federal Institute of Technology (ETH) Zurich, 2003.
Sullivan, Alan, "58.3: A Solid-state Multi-planar Volumetric Display," Stereoscopic Displays and virtual Reality Systems XI, vol. 5291, 279-284, 2003.
Suyama, Shiro, et al., "Apparent 3-D image perceived from luminance-modulated two 2-D images displayed at different depths," SID Digest, Vision Research 44 (2004) 285-793.
Tamura, Shinichi, et al., "Multilayer 3-D display by multidirectional beam splitter," Applied Optics, Oct. 15, 1982, vol. 21, No. 20, 3659-3663.
Uehira, Kazutake, "New depth-fused 3-D perception on 3-D display system using two stereoscopic displays," Journal of Electronic Imaging 16(3), 033022 (Jul.-Sep. 2007).
Zwicker, M., et al., "Antialiasing for Automultiscoipc 3D displays," Eurographics Symposium on Rendering (2006).
Wetzstein, Gordon, et al., "Layered 3D: Tomographic Image Synthesis for Attenuation-based Light Field and High Dynamic Range Displays," SIGGRAPH, 2011 ACM SIGGRAPH 2011, ISBN: 978-1-4503-0943-1.

* cited by examiner

MUTLI-LAYER PLENOPTIC DISPLAYS THAT COMBINE MULTIPLE EMISSIVE AND LIGHT MODULATING PLANES

CROSS-REFERENCE TO RELATED APPLICATIONS

This application is a divisional of U.S. patent application Ser. No. 13/184,693, filed Jul. 18, 2011, which claims the benefit of U.S. Provisional Application No. 61/433,966, filed Jan. 18, 2011, both of which are incorporated herein by reference in their entirety.

BACKGROUND

1. Field of the Description

The present description relates, in general, to automultiscopic display methods and devices (e.g., methods and devices for creating differing views in differing directions without regard of eye position and without need for head-mounted gear to view three-dimensional (3D) effect), and, more particularly, to multi-layer plenoptic displays that combine multiple emissive and light modulating planes that are adapted to provide increases in depth range and resolution when compared to both parallax barrier displays and volumetric displays.

2. Relevant Background

Displays that provide the illusion of three dimensions (3D) have become increasingly popular in many entertainment settings from movie theaters, at venues such as amusement parks, shopping malls, and the like, and at home with advances in televisions, computer monitors, and video game systems. The trend toward 3D display devices is likely to continue and is being driven in part by the increasing amount of 3D content available for movies, television, and video games.

While the majority of 3D displays currently require that the audience or viewers wear special glasses, there has recently been significant research toward autostereoscopic and automultiscopic displays. In automultiscopic display systems, techniques are used to display 3D images that can be viewed without the use of special headgear or glasses. It is generally agreed within the entertainment industry that automultiscopic displays unencumbered by glasses offer significant advantages over other 3D displays. Technological progress has been made in providing automultiscopic displays with improved resolution and user-perceived quality, and such progress may soon lead to more widespread adoption of automultiscopic displays as long as issues with occlusion and limitations on user viewing positions can also be addressed.

In general, parallax-based displays and volumetric displays are the two main types of 3D displays that currently are used to provide an automultiscopic experience. Parallax-based displays typically include a parallax barrier and employ horizontally modulated blocking patterns to provide different viewer rays for different viewing angles. A parallax barrier is a device that may be placed in front of an image source, such as a liquid crystal display (LCD) or the like, to allow the image source to show or display a stereoscopic or 3D image without the need for the viewer to wear 3D glasses. The parallax barrier may include a layer of material with a series of precision slits that allow each eye of a viewer to see a different set of pixels, and this creates a sense of depth through parallax in an effect that is similar to 3D images viewed with lenticular devices used with printed interlaced images. Volumetric displays provide images of 3D objects with correct focus and depth cues by creating a volume of individually controlled light sources, which is in contrast to the multiplexing of light rays for differing viewing directions done in parallax-based displays.

Unfortunately, both parallax-based and volumetric displays have disadvantages that have limited their use and more widespread adoption to display 3D content. Parallax-based displays typically require an extremely large display resolution to satisfy the depth range of most 3D scenes and to avoid aliasing artifacts. Further, the effective horizontal pixel count viewable by each eye is reduced by one half.

Volumetric displays typically operate by superimposing translucent light emitters, and, as a result, a key disadvantage with volumetric displays is that they cannot represent occlusion or view-dependent effects (e.g., a viewer can often see objects behind a displayed foreground image instead of the foreground image occluding or blocking the object from view). In conventional volumetric displays, all voxels that are occluded by other voxels in an input 3D model are merged such that there are no mechanisms to block the light and provide proper occlusion.

Some occlusion-capable displays have been designed that have been labeled volumetric by some in the industry. However, these displays are usually quite similar to parallax barrier-based displays. For example, instead of using blocking patterns to provide different viewing rays for different viewing angles, such displays may employ time multiplexing with a high-speed projector and a rotating vertical anisotropic mirror to attain the same effect. As a result of this design, such displays suffer from the same problem as the parallax barrier-based display in that their working volume is limited by the angular resolution, e.g., the number of images displayed during one revolution of the mirror. In addition, physically scaling the design poses significant mechanical challenges. Other "volumetric displays" attempting to provide a truer autostereoscopic display also have issues limiting their adoption. For example, one such system uses two volumetric displays and a set of beamsplitters to direct the light from each display to the correct eye, but this system only displays two fixed viewpoints.

Hence, there remains a need for improved 3D displays (or display systems) and automultiscopy display methods that can better handle occlusions and other issues limiting use of such displays such as limited number of viewers/viewpoints, specific and tight viewer positioning requirements, and aliasing artifacts.

SUMMARY

The present invention addresses the above problems by providing multi-planar plenoptic display assemblies/systems (or displays) that include multiple spatially-varying light emitting and light modulating planes. In other words, the display assemblies described include at least one emitter element or device and at least one modulator element or device that can be used in conjunction according to display methods taught herein to display light field data on this new type of display assembly.

To assist in understanding the described concepts, the following description includes a mathematical notation describing each of the layers (provided by each light emitting and light modulating element/device) in terms of the corresponding light transport operators. The inventors have created a process that may be carried out by software (e.g., run within a display assembly controller or by a computer system used to first generate content/control programs for the display assembly), and this process (or algorithm) renders a light field with depth into a multi-planar plenoptic display assembly (e.g., assigns portions of the light field to the display assembly for display or presentation by differing ones of the display elements such as by a modulator used to provide a parallax barrier or by an emitting or emissive display element used to display a particular layer of the 3D content or light field).

The following description also provides an analysis of the bandwidth of a multi-planar plenoptic display assembly. This bandwidth is then compared (favorably) with the bandwidth of traditional parallax barriers. The results of simulations for different display configurations are also presented in the following description. Numerous implementations of multi-layer plenoptic display assemblies may be utilized to practice the ideas and display methods taught herein, and, with this in mind, the description includes two different embodiments of useful display assemblies that have been successfully prototyped by the inventors. The first design uses a dynamic parallax barrier (e.g., a modulator plane or modulating element in the form of a liquid crystal display (LCD)) and a number of bi-state (transparent/translucent) screens (e.g., 2 to 3 or more emitting elements or emitter plane devices such as polymer-dispersed LCDs or (PDLCDs)). The second design uses a beam splitter to co-locate one or two pairs of automultiscopic displays, a parallax barrier (the modulator plane), and a static rear projector screen (e.g., the emitter plane). In some implementations of this second design, two automultiscopic displays may be collocated in the setup. A projector-diffusor pair is one example of such an automultiscopic display, with other examples including two LCDs stacked together to form an automultiscopic display. Both designs were evaluated on a number of differing 3D scenes/content, and the advantages and disadvantages of each design are presented.

More particularly, an automultiscopic display apparatus is provided that includes a planar light modulating device, such as an LCD, that is selectively operable to display parallax barrier patterns (e.g., occluded portions of view-dependent components of a light field). The display apparatus also includes first and second planar emitting devices each selectively operable to emit received light, and these may also be LCDs (such as PDLCDs) such that they are arrays of point light sources. In practice, three or more PDLCDs may be utilized (with more being possible/useful with a high speed projector), and the number of such planar emitting devices is generally only limited by the actual hardware employed. The display apparatus also includes a controller (or computer with decomposition/display software) operating the first and second emitting devices to display first and second components of a light field and operating the modulating device to occlude a portion of the light field.

In some embodiments of the display apparatus, the first and second components both include view independent components that were extracted from the light field. The first and second emitting devices are typically positioned to display the first and second components in spaced apart planes (e.g., stacked in a parallel manner behind the modulating device or at differing distances from a beam splitter). The first component of the light field may include view-dependent components extracted from the light field and the parallax barrier pattern may be generated to mask view-dependent occlusions in the light field, whereby portions of the first component are blocked by the modulating device. In practice, the modulating device may be configured to be opaque or transparent at an array of spatial positions to display the parallax barrier pattern, e.g., be an LCD monitor selectively operable or programmable by the controller to display one or more parallax barrier patterns to occlude portions of the light field.

DETAILED DESCRIPTION

Figure 1:
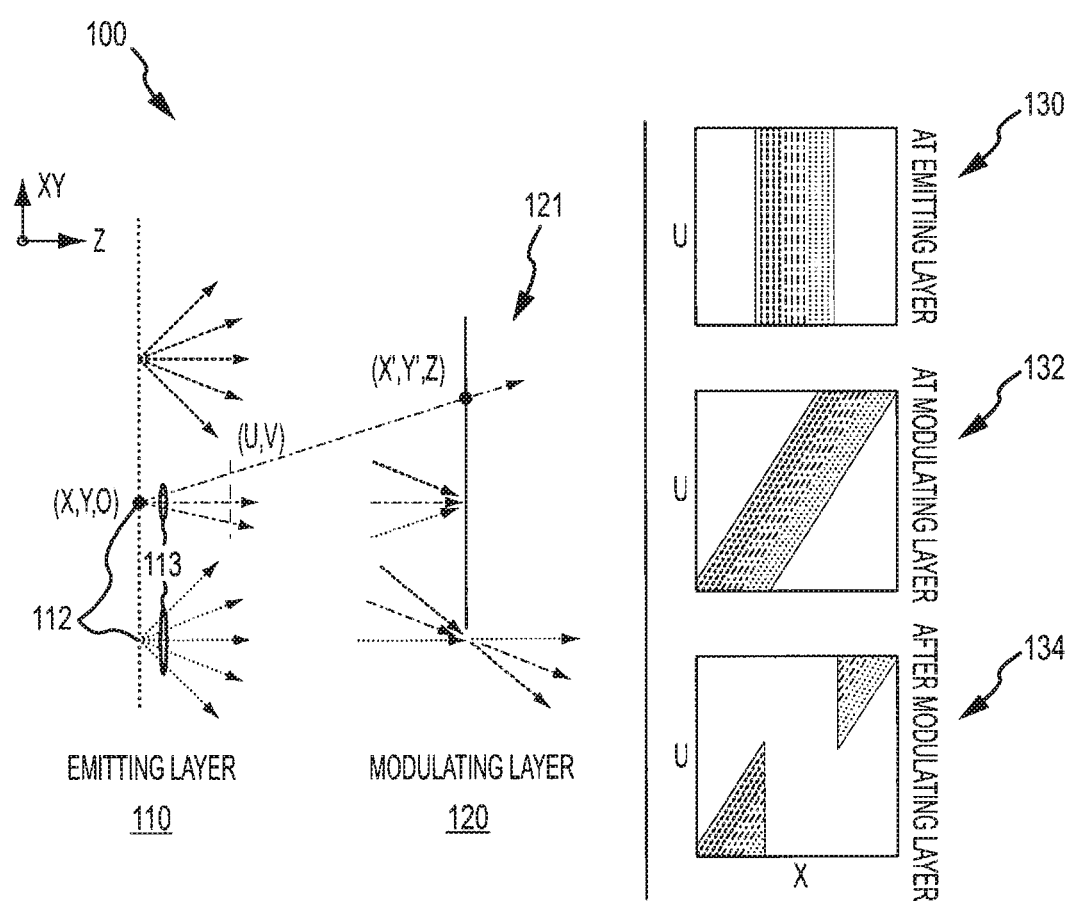
FIG. 1 illustrates graphically light transport in a portion of a multi-layer plenoptic display assembly of the present description.

Briefly, the following description is directed toward multi-planar plenoptic displays and autostereoscopic display methods making use of such displays. These displays or display assemblies uniquely combine elements of both parallax barrier displays and volumetric displays to achieve a surprisingly better display of 3D content. In general, the multi-planar plenoptic display assemblies include multiple display elements that are used to provide two or more planes including at least one light emitting plane and at least one light modulating plane. The display assemblies utilize these display elements to alleviate common problems present in both parallax barrier-type displays and volumetric-type displays. In particular, the display assemblies taught and described herein are operable to represent volumetric (or 3D) content with proper occlusion between different elements or objects within a 3D scene. Moreover, the display assemblies may be designed and operated to increase the available depth range, which had limited use and effectiveness of typical parallax barrier-type displays.

The design space for multi-planar plenoptic display assemblies of the present description is large since there are many possible ways to arrange and combine the differing components (e.g., the emitter plane device(s) and the modulator plane device(s)). Therefore, to better explain the significant concepts taught by the inventors, the description below begins with a mathematical framework that describes light transport for different display elements and their various combinations. Then, given a particular light field, scene depth, and display assembly configuration, the description explains how the display method (or a display assembly's components such as software programs) includes steps to decompose the input light field (or 3D content file) into components (or light field portions, segments, subsets, or the like) that each can be separately rendered or displayed/presented by different ones of the display layers or display elements of the multi-layer plenoptic display assembly. In other words, a controller of the display assembly functions to synchronize operation of each of the separate display elements to selectively display a portion or subset of the light field.

Further, the following description provides an analysis of the available bandwidth of the multi-planar plenoptic displays, which shows that their bandwidth increases linearly with the number of display elements. The inventors describe simulations of different configurations of multi-planar plenoptics display assemblies, and this includes providing an error analysis with respect to the input data. Two prototypes or useful embodiments of display assemblies are then described with reference to the figures.

The first embodiment of a display assembly uses a single dynamic parallax barrier (e.g., a modulator or modulating element operated by the controller as a changeable parallax barrier), a stack of bi-state translucent shutter glass (e.g., two or more emitters or emitting elements), and a projector projecting on these emitters. Each sheet of the shutter glass can act as (and be controlled as) a separate spatially-varying, light-emitting plane (or emitting element). This first embodiment can render volumetric or 3D content with proper occlusion processing and view-dependent shading and specularities. The second embodiment of a display assembly uses interleaved, dynamic parallax barriers and static diffusers, and this second design is capable of displaying a scene with a large depth range.

Briefly, the reader of this description should readily be able to identify several innovative steps or contributions provided by the inventors. First, the inventors teach design and use of multi-planar plenoptic displays as well as a mathematical framework to analyze light transport by such displays. Second, the inventors teach an algorithm or computer-implemented method to decompose an input light field (or input light field data set) into components (e.g., light field portions or subsets of the light field data set) and further teach an algorithm or computer-implemented method to render these components on a multi-planar or multi-layer plenoptic display. Third, the inventors provide a bandwidth analysis for multi-planar plenoptic displays. Fourth, the inventors describe an analysis of different layer/plane display element configurations as well as the respective error compared to the ground truth data. Fifth, the inventors teach two specific and differing physical implementations or embodiments of multi-planar plenoptic display assemblies that have been proven to extend depth range and to render volumetric or 3D content with proper occlusion and view-dependent shading and specularities.

The display assemblies described may be thought of as a hybrid multi-layer plenoptic display that includes multiple layers of automultiscopic and volumetric display primitives (e.g., display elements). A "primitive" may be operated to either emit incoming light (e.g., from a projector providing 3D content or a light field) or modulate the incoming light. The mathematical framework for light emission, modulation, and transport for a given layer/planar configuration of the display elements or primitives is described below. A process or algorithm is presented that can be used to decompose or divide an input light field (e.g., content that describes or provides a 3D scene) into an approximated output light field, which can then be directly mapped onto the different display elements/primitives of a given multi-layer display assembly. The decomposition process/algorithm may then be analyzed as discussed below in terms of resulting bandwidth and approximation errors.

The inventors validated their decomposition algorithm and their display simulations by using two different display assembly prototypes. The first setup/prototype used a stack of emitting primitives combined with one modulating primitive. The second display setup uses two parallax barrier primitives that are virtually stacked onto each other (e.g., via a beam splitter). The following description further includes an analysis of the results of these two prototypes/setups for a variety of input light fields and also includes a discussion of possible limitations of these displays and possible modifications to address such limitations.

Before turning to particular implementations for display assemblies, it may be useful to define a model for mathematically analyzing multi-layer plenoptic displays. This analysis can then be used to assemble various display assemblies from a small set of primitives (display elements) in order to achieve higher resolution and greater apparent depth than achieved with prior autostereoscopic systems. The analysis of the multi-layer display assembly is based on emission, transport, and modulation of the light field, l. In general, the light field, l, describes radiance of light rays passing through points (x,y) and (u,v) at a distance, z, from the xy plane, and the light field may be denoted as l(x,y,z, u,v). For ease of explanation, the following analysis only considers light rays traveling along the positive z direction, as the display assemblies will typically only be viewed from the front when in use.

FIG. 1 illustrates with a graph 100 the basic light transport in a display that includes an emitting layer 110 and a modulating layer 120. The graph 100 shows that the emitting layer (emitter or emitting device) 110 includes an array of point light sources 112 emitting light 113 toward an inner or back side of a modulating layer (modulator or modulating device) 120, which includes an array of optical elements that can either be opaque/translucent or substantially transparent to transmit light 121 outward from the display assembly to a viewer (not shown). Graphs 130, 132, 134 show the light field after the emitting layer 110, received at the modulating layer 120, and after the modulating layer 120, respectively.

Figure 2:
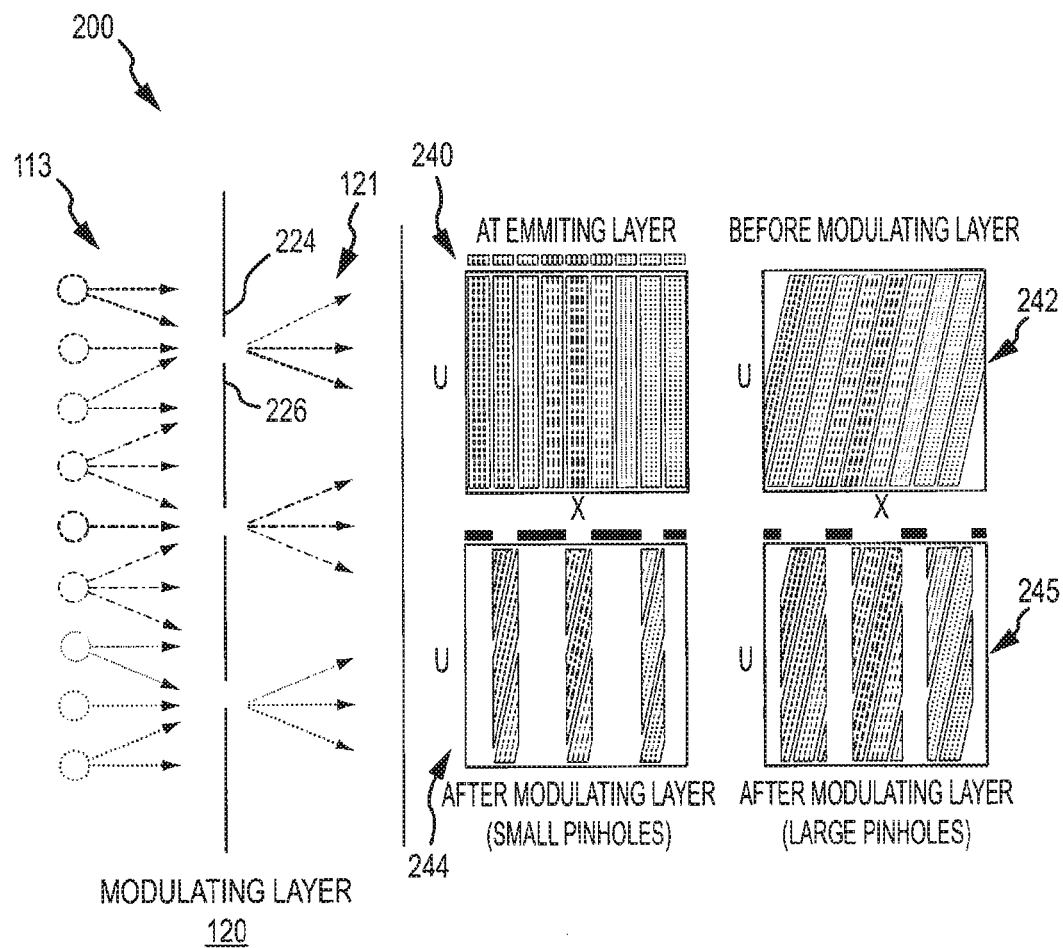
FIG. 2 illustrates graphically light transport in the modulating layer of a multi-layer plenoptic display assembly (or parallax barrier display)

Each ray is parameterized by (x,y), z, and (u,v). As the ray moves in space, its (x',y',z) position changes by shear, but its angle is constant. Emitting layers, such as layer/emitting device 110, act as an array of point light sources 112 and are constant across all angles. Modulating layers, such as layer/modulating device 120, are also constant in angle and can be dynamically or selectively made to be opaque at each spatial position (or at each optical element) to create a plurality of transmissive openings or "pinholes" (as shown in FIG. 2) that transmit light 121 to a viewer observing or using the display assembly. The basic light transport is illustrated in FIG. 1. A ray starting at position (x,y) passing through (u,v) traverses in free space to position x'=x+zu, y'=y+zv. As the ray moves in depth, its position will change to (x',y',z) while keeping its original traveling direction.

FIG. 2 illustrates with a graph 200 further details, of basic light transport in a display with particular emphasis on the modulating layer 120. The graph 100 shows the modulating layer receiving light 113 from an emitting layer or plane. The modulating layer or modulating device 120 is controlled to provide a parallax barrier with its spatial positions or optical elements operated to selectively be opaque to provide barriers/blocks 224 to light 113 and other ones of the spatial positions or optical elements operated to be transparent/translucent to provide pinholes/openings 226 through which light 121 is transmitted on to a viewer. This case describes the principle of autostereoscopic and automultiscopic displays using parallax barriers for multiplexing different images into different views, but, it will be understood, this is only one exemplary or special case of this particular setup or tested arrangement.

The light field 113 is shown graphically at 240, 242, 244, and 245 as it may appear at the emitting layer 110, before the modulating layer 120, and after the modulating layer 120 with small and large pinholes 226, respectively. As shown, a parallax barrier provided by the barriers/blocks and holes 224, 226 of the modulating layer 120 allocates the spatial variation of the emitter 110 into spatial and angular variation. Increasing the size of the pinholes 226 increases the display brightness, but it also causes visible crosstalk, as can be seen in the upper left and lower right corners of the three bars in the image 245.

Any new display assembly can be constructed by stacking (or combining) multiple parallel planes (display elements) that either emit or spatially modulate light. In the notation used herein, all planes (display elements) are co-aligned with the x,y axes and are stacked along depth z. Each plane/display element/primitive modifies the rays passing through it relative to their x,y position but not in the u,v orientation. From FIGS. 1 and 2, it is clear that the emissive plane or primitive 110 (or E) acts like an array of point light sources 112 that each emits constant spherical waves. The notation $E_z(x,y)$ may be used as the x and y values for the plane at depth z. The emissive plane 110 adds light to an input field, $l_i$ (such as a light field from a projector) and yields an output light field, $l_o$ (also shown at 113 in FIGS. 1 and 2), which may be represented as $l_o(x,y,z,u,v) = l_i(x,y,z,u,v) + E_z(x,y)$.

A spatial modulating plane, V (also known as the modulating element and labeled 120 in FIGS. 1 and 2), will partially attenuate certain rays 113. The modulating layer, $V_z(x,y)$, is therefore represented as scalar between zero and one, and the output light field 121 can also be described or represented as $l_o(x,y,z,u,v) = l_i(x,y,z,u,v) V_z(x,y)$.

With regard to a light field layer, a multiscopic parallax barrier layer device or assembly can be provided with arrangement shown in FIGS. 1 and 2. In other words, a parallax barrier layer assembly or display uses one emissive layer (one emitting element such as element 110) and one modulating layer (one modulating layer or element such as element 120), and these two layers or display elements are separated by a small distance, $\Delta z$. Since this pairing is important to the display assemblies described herein, the light field layer (or multiscopic parallax barrier assembly) is considered a third primitive.

In the parallax barrier layer or assembly, the modulating layer is used to achieve ray separation by displaying a vertical slit pattern, while the emissive layer displays the different rays that pass through the slits. As a consequence, an observer will see different rays from different directions. In each emitter row, N pixels can be partitioned into any number of spatial, x, and angular, u, samples, such that N is greater than or equal to xu. In practice, such displays trade a substantial reduction of spatial resolution for a relatively small amount of rays and apparent depth.

Figure 3:
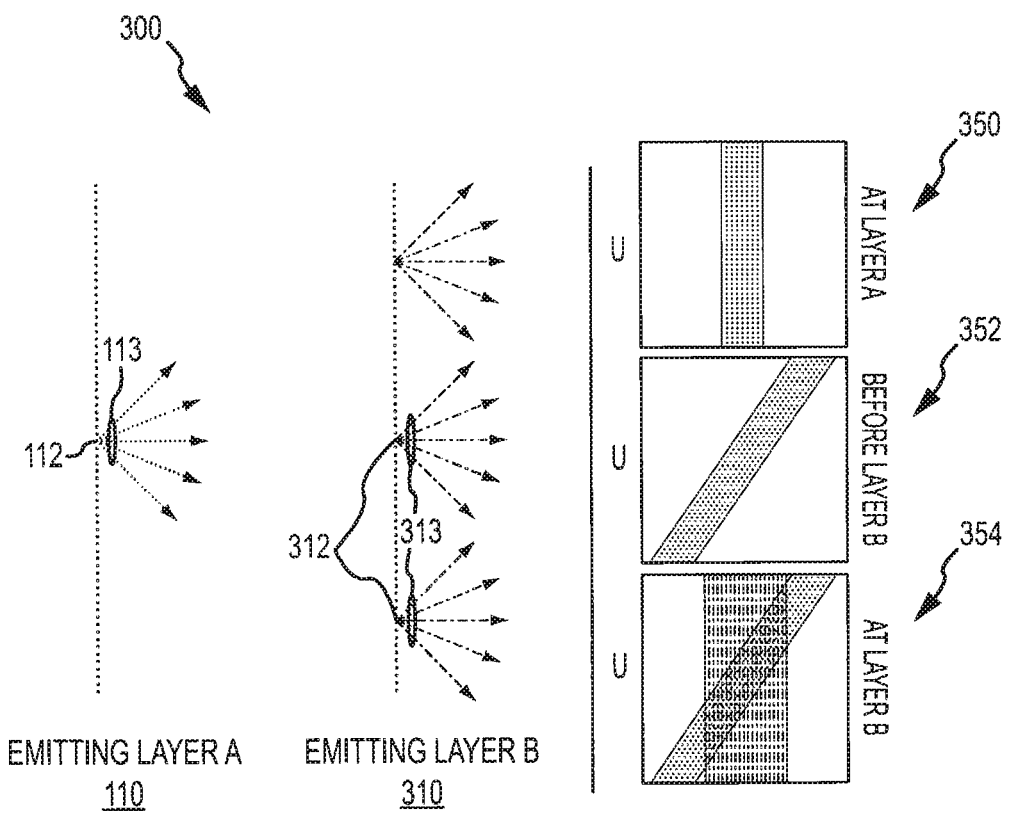
FIG. 3 illustrates graphically light transport in a display assembly with two emitter layers (or emitting devices) stacked in parallel.

FIG. 3 provides a graph 300 showing emitting layer superposition, and a display assembly may include two, side-by-side emitting layers 110, 310. Each provides an array of point light sources 112, 312 emitting light 113, 313. The light rays or light fields are shown at 350, 352, 354 at the first emitting layer 110, before the second emitting layer 310, and at the second emitting layer 310, respectively. Two emitter planes 110, 310 at different depths, as shown, allow for (or provide a display assembly with) more accurate light field rendering. This effect can be created in a display assembly using a beam splitter, temporal multiplexing with an electrically switchable scatterer, transparent OLEDs, or the like.

With regard to FIG. 3, the model for multi-layer plenoptic display assemblies combines multiple emitter and modulating planes (or emitting and modulating display elements) using a superposition onto the same optical path. Specifically, FIG. 3 illustrates with graph 300 that, using superpositioning, additional rays can be generated or can be partitioned into different angular resolution bins.

Based on the mathematical analysis in the above paragraphs with reference to FIGS. 1-3, an algorithm or method, which typically is carried out by software can be described for displaying an input light field (or 3D content) in a particular/selected multi-layer plenoptic display assembly. Specifically, the display algorithm approximates an input light field, $l_{IN}(x,y,u,v)$ as an output light field, $l_{OUT}(x,y,u,v)$ that is targeted for a given or selected multi-layer plenoptic display assembly. The display algorithm/method decomposes the input light field into a number of components (field subsets/portions), and each component is then displayed on one or more of the display primitives (e.g., a controller operates the primitives or emitting and modulating display elements to selectively display the components produced by the decomposition of the input field). In order to aid the decomposition process/step, an assumption may be made that for all rays (x,y,u,v) of the input light field that the depth, z, is known for the closest object, the diffuse component $R_D$, and the specular/glossy component $R_S$.

More specifically, the display algorithm/method separates the light field data into planar components. First, the view-independent volumetric components, $l_{VIV}$, are extracted from the light field, i.e., $l_{VIV}$ will contain the rays that are not occluded at any angle. Second, a view-dependent, partially occluded volumetric part or component, $l_{VDV}$, is extracted from the light field data. Third, the remaining residue, $l_{VDL}$, is extracted for rendering with parallax barrier layers. Algorithm/method 1 below gives a high level overview of this display algorithm/method that is used to generate the output light field, $l_{OUT}$, from an input light field, $l_{IN}$, for a given display assembly, $D_{IN}$.

---

Algorithm 1: High level overview of the rendering algorithm.

$l_{VIV} \leftarrow$ assignViewIndependentVolumetric($l_{IN}, D_{IN}$)
$l_{residue} \leftarrow l_{IN} - l_{VIV}$
$l_{VDV} \leftarrow$ assignViewDependentVolumetric($l_{IN}, l_{residue}, D_{IN}$)
$l_{residue} \leftarrow l_{residue} - l_{VDV}$
$l_{VDL} \leftarrow$ assignViewDependentLightfield($l_{residue}, D_{IN}$)

---

Figure 4:
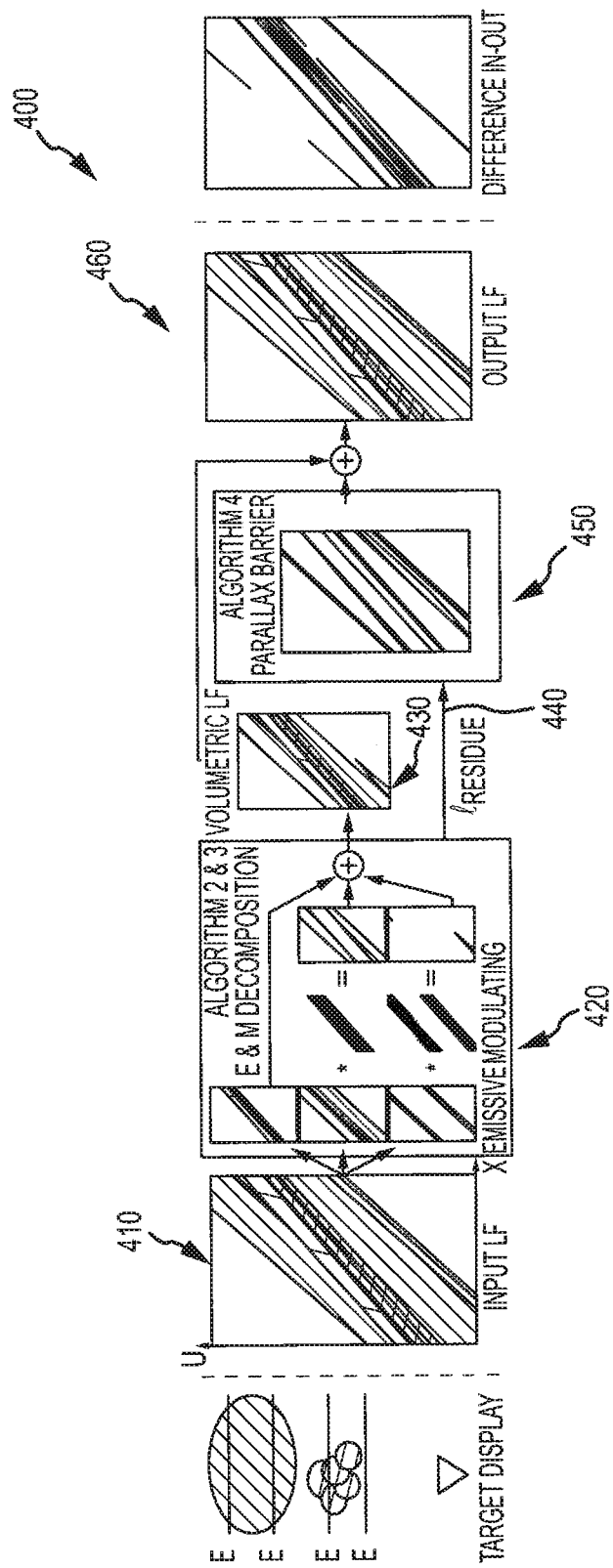
FIG. 4 illustrates an exemplary display (or decomposition) method for use with a display assembly of the present invention.

FIG. 4 illustrates an exemplary display (or decomposition) method 400 that may be used for a display assembly made up of three emitting display elements (emissive layers), one modulating display element (modulating layer), and one parallax barrier element (parallax barrier layer). The method 400 may be carried out by a processor(s) running a software program configured to carry out the steps of Algorithm/method 1 shown and described above. Specifically, an input light field (or light field data set) 410 is provided, and emissive and modulating decomposition is performed at 420 including assigning separated components to the emissive and modulating layers, e.g., to provide a volumetric light field display as shown at 430 (with the emissive layers operated according to Algorithm 2 and the modulating layers operated according to Algorithm 3 discussed below). The residual 440 from these decompositions is typically assigned or provided to the parallax barrier layer for rendering based on or after performance of Algorithm 4 described below. In combination, the method 400 provides or displays the output light field 460.

With regard to the emissive layers, in a first step of the method 400, all diffuse components are extracted from the light field 410. The extracted components, which may also be considered view-independent components, are then distributed onto the available emitting layers (or emitting display devices). Only extracted components that are spatially close enough to the emitting layers are considered for display. More specifically, each part of $R_D$ (or the diffuse components) that is within a preset (but, user adjustable in many cases) distance or threshold distance, $z_{thresh}$, from any emitting layer is assigned to the nearest emitting layer in the layered setup, $D_{IN}$. Assignment is performed by projection in some embodiments of the method 400. The parts of the diffuse components $R_D$ that are further than this threshold distance, $z_{thresh}$, from all emitting layers are not processed and are left as residue 440 for the automultiscopic display layers. Algorithm 2 below summarizes this procedure of operating the emitting display devices or layers of the display assembly to display portions of an input light field (or 3D content).

---
Algorithm 2:
---

$l_{VIV}$ ← assignViewIndependentVolumetric($l_{IN}$, $D_{IN}$)
for emissiveLayer ∈ $D_{IN}$
    for x,y,z,$R_D$ ∈ $l_{IN}$
        dz ← distance([x,y,z],emissiveLayer)
        if $R_D$ ≠ 0 and dz < $Z_{thresh}$
            emissiveLayer[x,y] ← $R_D$
            $l_{VIV}$.add([x,y,z,$R_D$])

---

Next, the display method 400 is adapted to consider view dependent components of the input light field 410. After extracting the view-independent components, the remaining view-dependent light field parts need to be displayed on a combination of the emissive layers and the modulating layers of the multi-layer plenoptic display assembly. In the following discussion, an algorithm/method (a subroutine of the overall display method/algorithm (e.g., Algorithm 1)) is described that is capable of approximating proper occlusion using modulating layers as light blockers. Then, a step or subroutine for approximating the remaining residue using parallax barrier rendering is described.

In some display assemblies, a collection of modulating layers may be used to achieve volumetric rendering with occlusion. In the simplest and most straightforward case, multiple modulator-emitter pairs may be stacked to achieve direct proper occlusion. However, many light modulators, such as LCD panels, tend to absorb a substantial amount of light. Hence, it may be impractical to stack multiple modulating layers in sequence. Instead, view-dependent occlusions are approximated in some embodiments using fewer modulating layers (e.g., one to three layers or the like).

To this end, the display method may use Algorithm 3 to approximate proper occlusion. For every emissive ray, the algorithm/method (or software running a program implementing the method) identifies all occluders in the input light field, $l_{IN}$ (also labeled 410 in FIG. 4). Then, all occluded rays are masked by the closest modulating plane (or modulating display element of the display assembly), and all visible rays are distributed to the emissive layers (or emitting display elements of the display assembly), with these results/steps shown at 420 and 430 in FIG. 4. Also, see, Algorithm 3 below for more detail.

---
Algorithm 3:
---

$l_{VDV}$ ← assignViewDependentVolumetric($l_{IN}$, $l_{residue}$, $D_{IN}$)
for emissiveLayer ∈ $D_{IN}$
    for x,y,z,$R_D$ ∈ $l_{residue}$
        dz ← distance([x,y,z],emissiveLayer)
        if $R_D$ ≠ 0 and dz < $Z_{thresh}$
            emissiveLayer[x,y] ← $R_D$
            $l_{VIV}$.add([x,y,z,$R_D$])
            for x',y',z',$R'_D$ ∈ $l_{IN}$
                if occludes([x',y',z'],[x,y,z])
                    modulator ← getClosestModulator([x',y',z'])
                    modulator[x',y'].occlude( )
for modulator ∈ Modulators
    for u,v ∈ modulator.OccludedPixels( )
        $l_{VDV}$.removeXYZOccludedBy(modulator[u,v])

---

After the previous step of the display/decomposition method is carried out, the residual 440 will mainly include view-dependent effects, $l_{VDL}$, which will be rendered using parallax barrier primitives as shown at 450 of FIG. 4. More specifically, the following three components will be left in the residual 440: (1) view-dependent shading such as glossy or specular reflection; (2) scene elements that were too far away from any emissive plane to be rendered volumetrically (as shown at 430); and (3) all occluded diffuse rays that could not be represented using a combination of emissive and modulator elements or devices of the display assembly.

Before distributing the residual light field 440 to the parallax barrier layers of the display assembly, two additional tasks may be performed by the controller/computer system. First, the depth of the specular highlights may be adjusted to be the same depth as its diffuse counterpart (otherwise, the specular highlights may not follow the projected geometry). Second, if the spacing between consecutive emissive layers is wide, some viewing rays may be undefined. With regard to error due to distant layer spacing, a continuous surface may result in holes in the resulting light field. These holes can be filled by analyzing the neighboring light rays that belong to the same surface and can be filled by reparameterizing and interpolating in between them. In this second case, then, the respective empty areas may be filled by performing a ray reparameterization between the light field borders that are present on the two closest emissive planes (two closest emitting devices of the display assembly).

For example, a light field may contain an empty space between two adjacent emissive layers or two emitting devices, and angular reparameterization may be used to cause the first and second emissive layers (or emitters/emitting devices) to fill the hole or empty area. Holes are filled by the automultiscopic primitives. In other words, the projection of scene objects creates holes as the parts between emissive layers (further apart than z_thresh) remain unchanged. Then, the elements between layers can be scaled along the z direction until they touch the emissive layers to fill the holes. This scaling corresponds to the angular reparameterization.

The resulting light field 450 is then rendered using the light field primitives (e.g., devices within the multi-layer plenoptic display assembly) as described above. Element 460 in FIG. 4 represents what the whole display produces, e.g., emissive plus light field layer. To remove aliasing artifacts, a pre-filter may be applied. In contrast to a single parallax barrier light field layer, 3D scenes can be rendered more effectively with multiple parallax barriers provided at different depths. Finally, the light output from all parallax barriers can be superimposed to create an intended effect. Algorithm 4 shown below summarizes the procedure for parallax barrier rendering given a residual light field, $l_{residue}$, (labeled 440 in FIG. 4) and also given the diffuse component $R_D$ and the specular/glossy components $R_S$.

---
Algorithm 4:
---

$l_{VDL} \leftarrow$ assignViewDependentLightfield($l_{reidue}, D_{IN}$)
for x,y,z,u,v,$R_D,R_z \in l_{residue}$
  if $R_D$(x,y,z,)on emissiveLayer
    Project $R_z$(x,y,z,u,v) onto $R_z$ (x,y,emissiveLayer.z,u,v)
  Perform hole filling for continuous surfaces: WarpResidue ($l_{residue}$)
  for light fieldLayer $\in D_{IN}$
    for x,y,z,u,v,$R_D,R_z \in l_{residue}$
      light fieldLayer [x,y,u,v] $\leftarrow R_D + R_z$
      $l_{VDL}$.add([x,y,z,u,v,$R_D\ R_z$])

---

It may be useful in implementing an effective display assembly to discuss the errors that are introduced by the approximations discussed above. With regard to the emissive and blocking layers, the projection onto the planar emitters inherently produces an approximation of the motion parallax. The motion parallax produced by an object at distance z to a viewer with focal length f that moves along a baseline at a distance b can be expressed as d=−fb/z. Therefore, the relative projective approximation error of an object at distance z projected on a plane at distance $z_0$ may be expressed by:

$$e(z, z_o) = \left| \frac{1}{z_o} - \frac{1}{z} \right|.$$

The emissive layers are, therefore, preferably placed near dense occurrences of objects in depth and the occluding layers are placed as near as possible to the respective layers that need occlusion. Furthermore, fewer display devices are needed the farther away the scene is with respect to the viewer's position. This error can be used to determine the optimal display configuration using a suited optimization method in cases where a display configuration is optimized for a given type of scene. Generally, it only depends on the depth, so different scenes with similar geometry (e.g., as in cartoons where often there is one plane background and one plane foreground) can use the same "optimal" display configuration.

With regard to the parallax barrier layers of the display assembly, parallax barrier layers trade off spatial resolution against angular resolution. Therefore, the approximation error is directly proportional to the loss in spatial resolution. However, additional errors may be introduced if aliasing occurs when the angular frequencies are too high. These problems can be overcome by either using time multiplexing for the parallax barrier display (which naturally extends its bandwidth) or by combining multiple parallax barrier displays superimposed onto the same optical path.

At this point in the description of multi-layer plenoptic display assemblies, it may be useful to analyze the bandwidth of multiple layers of parallax barrier-type displays. A Lambertian surface will correspond to a 2D plane in the 4D light field, l(x,y,u,v). Therefore, the Fourier transform, l(light field spectrum), will include non-zero entries only on the 2D plane, $l(\omega_x, \omega_y, s\omega_x, s\omega_y)$, where $s=(d-d_0)/d$, where d corresponds to the distance of the surface to the xy plane, and where $d_0$ corresponds to the distance of the uv and xy planes. As a consequence, the bandwidth of a light field display can be denoted as:

$$H(\omega_x, \omega_y, \omega_u, \omega_v) = \begin{cases} 1, & \text{for } |\omega_x| \le \pi/\Delta_x, |\omega_y| \le \pi/\Delta_y \\ & \text{and } |\omega_u| \le \pi/\Delta_u, |\omega_v| \le \pi/\Delta_v \\ 0, & \text{otherwise.} \end{cases}$$

Figure 5:
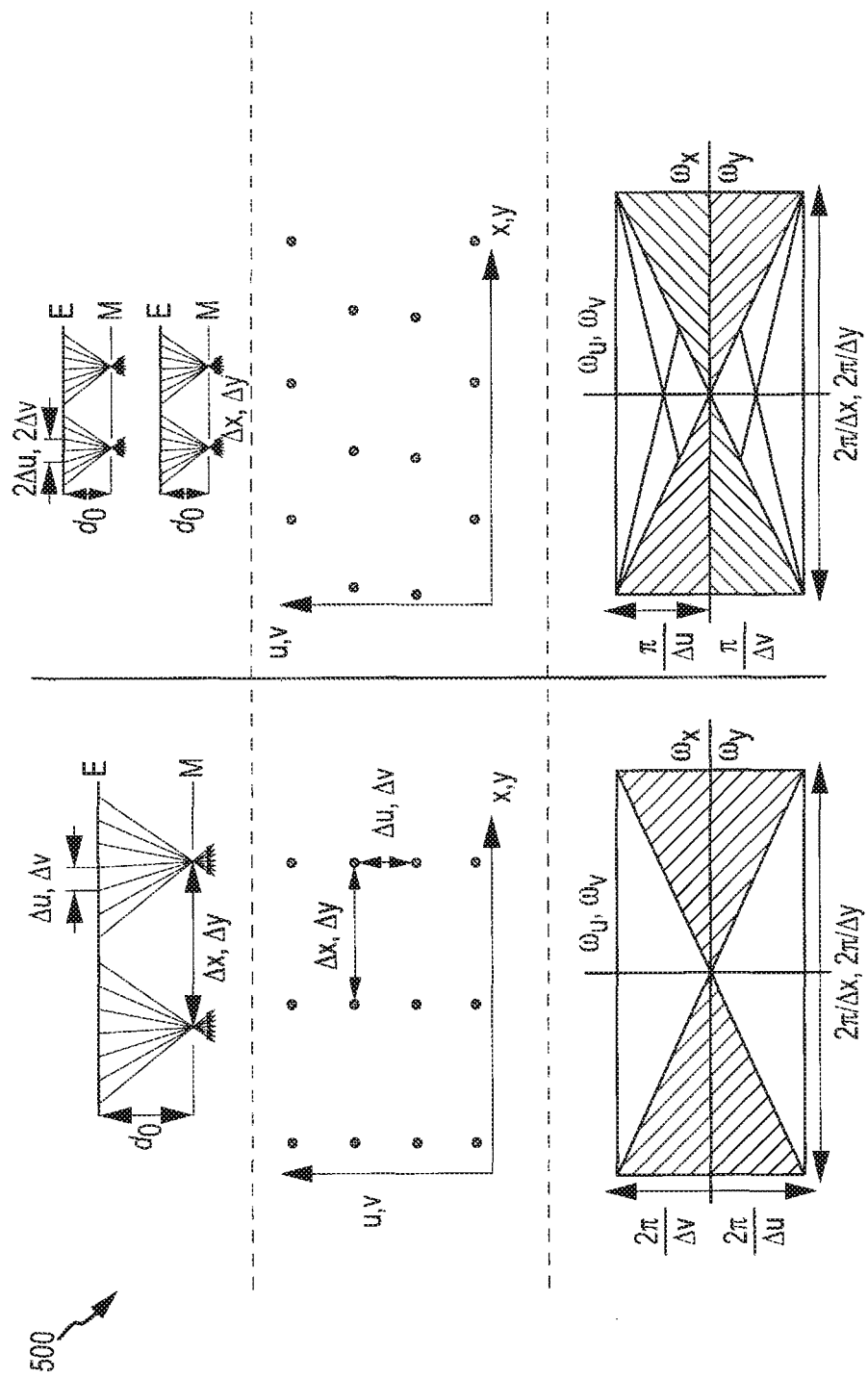
FIG. 5 illustrates graphically a bandwidth analysis for multiple layers of a parallax barrier-type display assembly.

The graph 500 of FIG. 5 shows the 2D case (not the 4D case as discussed above), and, basically, shows that any automultiscopic display may be replaced by an arbitrary number "n" of automultiscopic displays with 1/n bandwidth. The total required bandwidth of the system remains the same (e.g., n multiplied by 1/n). A benefit is only gained in 4D, as stated below, where the total required bandwidth (e.g, the sum of all individual bandwidths) decreased by 1/n. The graph 500 shows a bandwidth analysis for multiple layers of parallax barrier displays. The left part shows the bandwidth analysis for a multi-layer plenoptic display assembly with one parallax barrier. The right part, though, shows that by combining n displays the effective sampling can be reduced in two dimensions while keeping the amount of covered frequencies the same.

In case of uniform sampling in spatial and angular directions, respectively, the Nyquist limit defines the overall display bandwidth to $a^2b^2$, where $a=2\pi/\Delta x=2\pi/\Delta y$ and $b=2\pi/\Delta u=2\pi/\Delta v$. The lengths a and b define a box that encloses all possible frequencies that can be displayed without aliasing. The maximum depth range that can be displayed without aliasing is defined by the slopes $\pm(\Delta x/\Delta u)$ and $\pm(\Delta y/\Delta v)$, and these slopes then define a 3D wedge in 4D ($\omega_x, \omega_y, \omega_u, \omega_v$) space. This implies that only a subset of the total bandwidth can be used effectively for a given display assembly and a given frequency distribution.

When combining multiple displays, the effective bandwidth usage can be improved when displaying 4D light fields. If two light field displays are combined onto an optical path and separated by distance $\Delta z$, the effective sampling is sheared by $x=x-(\Delta z/d_0)u$ and $y=y-(\Delta z/d_0)v$. Therefore, the light field spectrum is sheared according to:

$$w_x^l = w_x$$

$$w_u^l = w_u + (\Delta z/d_0)w_x$$

$$w_y^l = w_y$$

$$w_v^l = w_v + (\Delta z/d_0)w_y$$

This implies that the bandwidths of multiple displays are sheared with respect to each other.

The bandwidth usage for 4D light field displays can be improved when substituting one display with two displays. In this case, each of the two displays has only half of the angular sampling in both u and v directions (see, FIG. 5, for example), but it can still produce the same light field content as the single display. The overall display (or display assembly) bandwidth for two displays can then be expressed as:

$$2a^2\left(\frac{1}{2}b\right)^2 = \frac{1}{2}a^2b^2$$

By the same geometric construction, the overall bandwidth for n displays reduces to $(1/n)a^2b^2$ while the same light field frequency content can be displayed. This means that a system or display assembly with n displays only needs 1/n bandwidth of a single display system. In cases when the frequency spectrum is sparse (e.g., when there are depth ranges that do not have any scene elements), the overall bandwidth may be optimized even further by proper positioning of the displays. This is even the case for 2D not only for 4D as described below.

Unfortunately, for 2D light fields, any general display configuration will still use the same bandwidth. However, even a multi-layered 2D parallax barrier configuration can preserve more high frequencies than a single parallax barrier display with the same bandwidth. For example, an input light field may be provided that is made up of one background object with the depth interval ($z_{B\_MIN}$, $z_{B\_MAX}$) and a foreground object occupying ($z_{F\_MIN}$, $z_{F\_MAX}$). A single parallax barrier would then have to cover the entire interval ($z_{F\_MIN}$, $z_{B\_MAX}$). When using multiple parallax barriers in display assemblies, the objects can be assigned to different light fields to ensure that the combined display bandwidth is allocated more efficiently. Note, the view-dependent effects should still be accurately pre-filtered in order to avoid aliasing artifacts. However, most of these can still be preserved quite well in a typical display assembly configuration. Similarly, high-frequency visibility/occlusion is preferably correctly pre-filtered to provide an aliasing-free display. Filtering is especially important for occlusions. Such occlusions look like shadows floating at the same depth as the occlude, and, as this occlude is displayed by a different automultiscopic layer out of the depth of field, the occlusion "shadow" is aliased.

With regard to quantitative error analysis, the resulting reprojection errors may be compared using a software simulation to analyze the impact of the number of emissive, modulating/blocking, and parallax barrier layers (or devices) used in a display assembly. To this end, the inventors simulated the following two different scenes: (a) a duck scene containing two objects at different depths with occlusion and (b) a sculptural bust scene depicting a continuous surface. All scenes contain a small amount of specular highlights. The simulated results were compared to a perfect rendering, and the MSE between the simulated and perfect images were computed for a number of views in a field of 15 degrees. The resulting error plots 610 and 620 are shown in FIG. 6, with plot 610 showing the impact of using multiple emissive layers (or emitters/emitting devices) and plot 620 showing the impact of using multiple modulating layers (or modulators/modulating devices).

In a first step of the quantitative error analysis, the impact of an increasing number of emissive layers was analyzed. For this analysis, it was assumed that each emissive layer can be combined with a perfect occluder in order to assess the impact of the motion parallax error and specular error only. The layers were placed around the center and spaced at equidistant distances. The error plot 610 of FIG. 6 shows that the error quickly decreases when the first few layers are added. Furthermore, the plot 610 also shows that adding more than 4 emissive layers (or emitting devices) does not significantly reduce the error.

In a second step of the error analysis, the impact of occlusion errors was analyzed when a fixed number of emissive layers were used in a display assembly, and then, the analysis involved increasing the number of occlusion layers. For this analysis, the occluders or modulating layers were placed after each emissive layer, starting from a front or forward-most layer. The plot 620 of FIG. 6 shows the errors for two different emissive layer configurations. An increasing number of occluders/modulating layers help to reduce the error significantly. However, here the light absorption has not been considered as it highly depends on the hardware used. Current LCDs absorb around 90 percent of light such that adding too many occluders may lead to bad or lower display brightness. However, once transparent LCDs are available it will likely pay off to use more as they do absorb less light. The error plots 610, 620 also show that increasing the number of occluders leads to significantly high errors due to incorrect occlusions.

Figure 6:
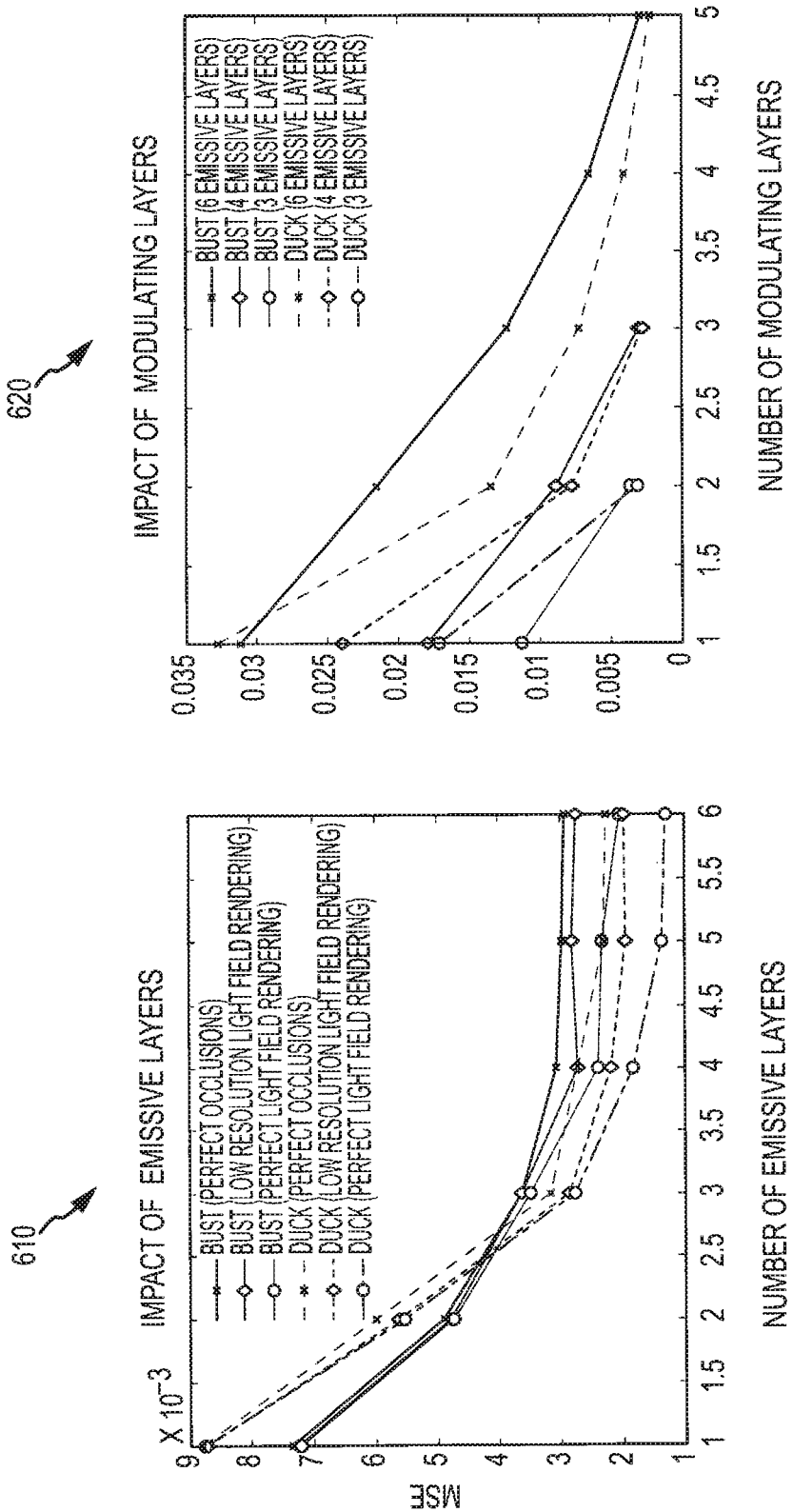
FIG. 6 illustrates error plots for emissive layers and for modulating/blocking layers in a display assembly.

In a third step of the error analysis, the error of ray reparameterization to add back occluded areas and view-dependent effects was analyzed (see plot 610 in FIG. 6). For this simulation, a perfect parallax barrier display was first used with sufficient spatial and angular resolution to display the full depth range aliasing free (see lines of plot 610 labeled as "perfect light field rendering"). Again, the analysis was performed for different numbers of emissive planes combined with one occlusion or modulating layer. In this test/experiment, a parallax barrier was used with a limited spatial resolution (e.g., barrier spacing of 6 pixels as shown by the lines/curves labeled "low resolution light field rendering"). As can be observed in the plots 610, 620, the error is quite a bit higher especially with the larger number of emissive planes.

In general, the display assemblies may be implemented with software (or code run by a CPU/processor(s)) that functions to analyze and decompose a light field to be approximated by a combination of one or more emissive layers (emitting devices) and one or more modulating layers (modulating/occluding devices). As output, the software generates the images or light field components/subsets required by each layer primitive as well as a light field describing the warped residue. The residue is then processed by a further software component of the display assembly (e.g., its controller/control computer system) to generate the images used by the automultiscopic layers. While computing the residue, the simulated views are typically computed, too. Execution time of the decomposition depends on the size of the input light field as well as the number of basic primitives used. The time, for example, may be nearly zero (or real time) in some cases when working on geometry rather than light fields as input, but the time may be greater such as varying between 30 seconds up to 3 minutes or more. Similarly, automultiscopic rendering of the residue may take up to 1 minute or more, depending on the size of the residue. The results of such processing may be stored in memory for later use in generating a 3D display with a display assembly described herein.

At this time, it may be useful to discuss exemplary devices that may be used to implement the layer primitives in embodiments of multi-layer plenoptic display assemblies. With regard to the modulator plane, common LCD monitors provide an effective way to spatially modulate light (or transparent LCDs may be used as their light transmission is much better), and LCDs may be used as the modulating device (or modulator layer/primitive) of a display assembly. Most monitors use a layer of twisted nematic (TN) liquid crystals controlled by a thin-film transistor array (TFT). These LCD monitors allow for large size, high resolution, and low crosstalk.

One disadvantage of common, commercially-available TN-LCDs is the fairly low switching speed, e.g., around 8 ms from black-to-white. There are faster switching technologies available, such as $\pi$ cells, that can switch in 1 ms. However, this faster technology may not be as readily available at the same size and resolution as common TN- LCDs but they may be used in place of the LCDs in the display assembly embodiments. A second disadvantage is that most LCDs have a color filter layer, which attenuates a majority of the light. LCDs without this color filter tend to be manufactured for specific high-dynamic range applications and are much slower than their color counterparts. Due to the high light loss, it may not be practical to have more than one modulating layer per light source in a display assembly. Even with one layer, the light source should be as bright as possible. Both prototypes/embodiments described below, therefore, only utilize a maximum of two TN-LCDs as the modulating devices.

TN-LCDs use polarizers in front and after the LC panel and, usually, the front polarizer is coupled with an additional diffuser. In order to operate the TN-LCDs as pin-hole modulators in a display assembly, it may be useful to remove the diffusing polarizer and replace it with a clear one. Preliminary measurements showed that light transmission of the LCDs is less than 10 percent in general and around 1 percent in a full blocking state. However, it is expected that transparent LCDs may transmit up to 90 percent or more light.

With regard to the emitter plane, transparent organic light emitting diodes (OLED) screens may be a promising candidate for use as the emissive planes (or emitting devices of the display assemblies), but OLEDs are generally not yet commercially available and do not yet provide enough transparency for a practical multi-layer display prototype. Hence, the inventors used temporal multiplexing of multiple switchable diffusers in combination with a fast projector to achieve multiple stacked emissive layers. More specifically, a display assembly may include polymer-dispersed liquid crystal displays (PDLCDs) as switchable diffusers. PDLCDs are most commonly used for switchable privacy glass although they have proven useful as switchable projector screens.

PDLCDs have similar properties to TN-LCDs except that, while TN-LCDs block linearly polarized light, PDLCDs scatter arbitrarily polarized light. When driven by a square waveform, the PDLCD layers become clear and transmissive. Note, the square waveform is typically used to switch polarity of the connectors, which is used to avoid damage of the liquid crystal fluid. Switching between transparent (on) and opaque (off) is achieved by applying the square wave or no current at all. When the power is removed, the PDLCD returns to its default diffusive state. PDLCDs can be driven by a current-limited square wave to achieve high switching speeds.

A high speed projector may be used in the display assemblies to illuminate multiple PDLCDs temporally multiplexed, where the PDLCD switching is synchronized using a custom trigger circuit. Each of the PDLCDs can be switched at 60 Hz, for example, and, therefore, imposes an upper limit for the maximum frame rate achievable by time multiplexing. The PDLCD layers transmit light at approximately 80 percent and scatter some of the light, which may be negligible for most display assemblies. Note, though, the PDLCD layers remove the polarization of the incident light and, therefore, cannot be used in settings that require polarization, which is the case for all LCDs. One simple solution, though, is to add polarizers immediately in front and after each LCD.

Figure 7:
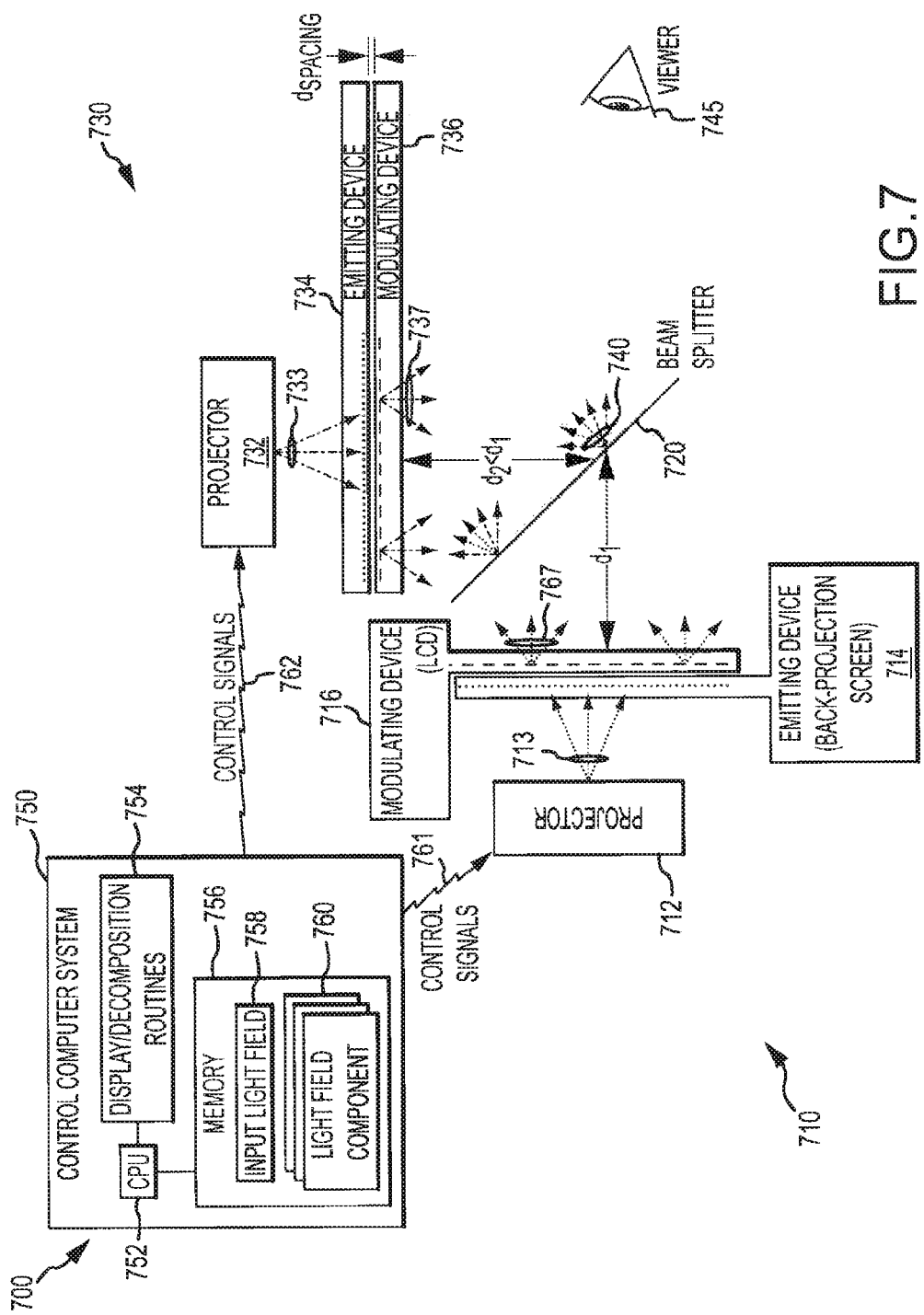
FIG. 7 illustrates schematically or in functional block form a multi-layer display assembly of one embodiment using spatial multiplexing and including two auto-multiscopic parallax barrier displays (note, though, the assembly is not limited to use of a projector/LCD combination as it may include or utilize an LCD/LCD combination (one being used for emission and one for modulation) or any automultiscopic display)
Figure 8:
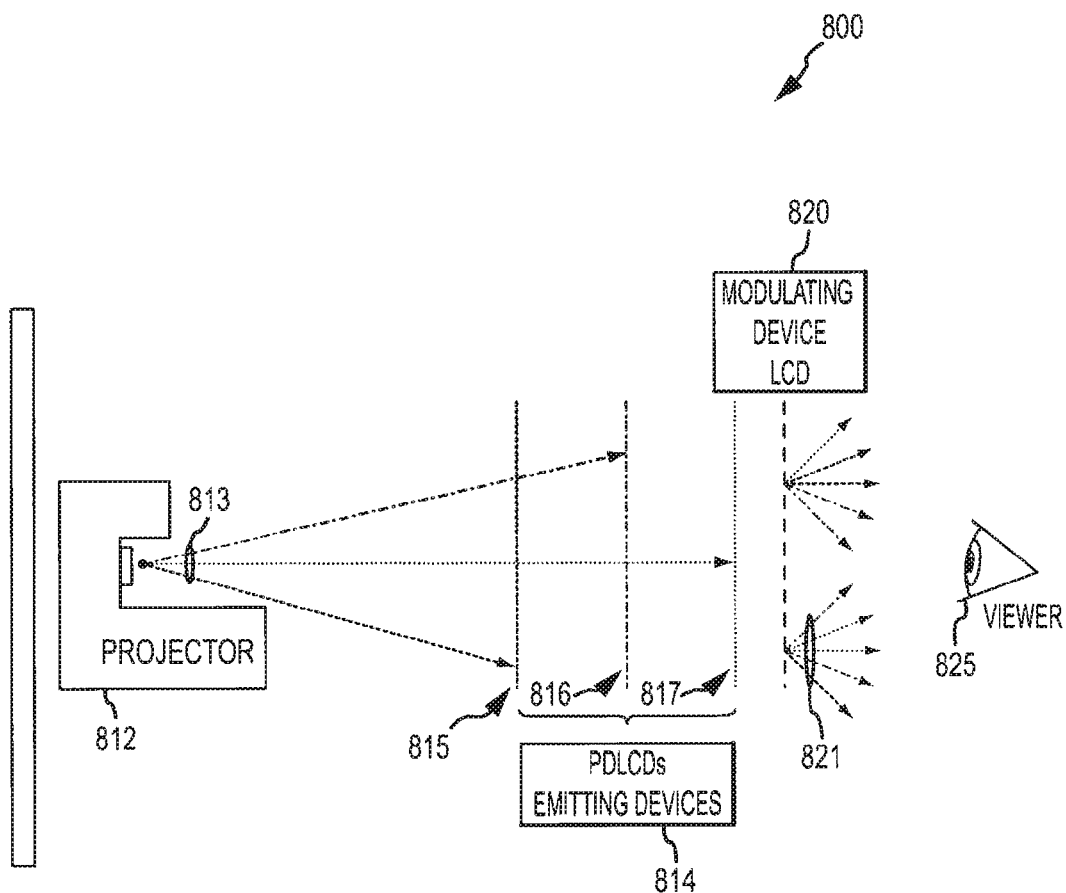
FIG. 8 illustrates another multi-layer display assembly using temporal multiplexing and including multiple emitting devices and a single modulating device.

Based on the analysis presented above, the inventors designed and implemented two types of multi-layer plenoptic displays, which are shown as display assemblies 700 and 800 in FIGS. 7 and 8. The first display assembly 700 uses spatial multiplexing to superimpose the different layers while the second display assembly 800 uses temporal multiplexing. Briefly, spatial multiplexing is performed by combining two automultiscopic displays 710 and 730 using a beam splitter 720. Temporal multiplexing is performed in assembly 800 by combining a projector 812 with multiple bi-state scattering planes 815, 816, 817 in an emitter assembly 814.

As shown in FIG. 7, the display assembly 700 includes a first (or rear) parallax barrier display 710 and a second (or front) parallax barrier display 730. Each display 710, 730 is formed with a projector 712, 732 projecting light (3D content based on light field components 760) 713, 733 onto the back side of an emitting device 714, 734. The emitting device 714, 734 is spaced apart a small distance, $d_{spacing}$, from a parallel, planar modulating device 716, 736, which acts to block some of the light from emitting device 714, 734 and outputs/transmits the output of the display 710, 730 as shown at 767, 737.

A beam splitter (e.g., silverized glass) 720 is provided to combine these outputs 767, 737 as shown at 740 (e.g., a portion of light 767 is transmitted and a portion of light 737 is reflected) and direct the light 740 (or output of assembly 730) to a viewer 745 for viewing a 3D display without special glasses. The first modulating device 716 is positioned a first distance, $d_1$, away from the beam splitter 720 while the second modulating device 736 is positioned a second distance, $d_2$, away from the beam splitter 720 that is smaller so as to provide two differing layers/depths of imagery to viewer 745.

The display assembly 700 includes a controller or control computer system 750 that functions to output control signals 761, 762 to selectively operate the two displays 710, 730 (as discussed above with reference to FIG. 4, for example). Specifically, the system 750 includes a processor(s) 752 that runs software/code in the form of a display and/or decomposition program or routine(s) that provides the functionality described above with reference particularly to Algorithms 1-4 (and, even more particularly, Algorithm 4 as there are only automultiscopic primitives). In this regard, the system 750 is shown to include memory 756 that may be used to store data/parameters necessary for performing the described decomposition and display algorithms/methods such as the design layout of the displays 710, 730, a threshold distance (z) for determining whether to display on nearby emitting devices 714, 734, scene depth, and so on. In operation of assembly 700, the system 750 may receive and store an input light field (or light field data set), and then use the software 754 to determine components or subsets of the light field 760 to be displayed or used to operate the display devices of the displays 710, 730 including the emitting devices 714, 734 and the modulating devices 716, 736. The control signals 761, 762 are used to cause these components 760 (as well as residuals and the like) to be displayed via operation of the projectors 712, 732, the emitters 714, 734, and the modulators 716, 736.

As can be seen, the display assembly 700 combines two auto-multiscopic parallax barrier displays 710, 730 using spatial multiplexing. The parallax barriers are only used for 3D light fields, i.e., the barriers only provide distinct rays aligned with the horizontal plane. Note, 4D light fields may also be displayed with the assembly 700 by using pinholes as the barrier in place of the stripe pattern. Both displays 710, 730 are combined onto the same optical path using a beam splitter mirror 720. Each of the displays 710, 730 is placed at a different distance, $d_1$ and $d_2$, from the beam splitter 720, and each display 710, 730 is used by the control computer system 750 via signals 761, 762 to display different parts 760 of the light field 758 to achieve increased depth range.

Each parallax barrier display 710, 730 is composed of a projector 712, 732 (e.g., a 120 Hz projector or the like or any emissive display device) paired with a diffuse back projection layer 714, 734 to provide the emissive primitive and also paired with a modulating device 716, 736 (e.g., a TN-LCD) operated to display a parallax barrier pattern to provide the modulating primitive in the assembly 700. Parallax barrier displays usually require large spacing between the barrier stripes to achieve an acceptable angular resolution. They, therefore, produce spatially under-sample images that additionally lack a considerable amount of brightness due to the pin-hole nature of the barrier. With this in mind, the assembly 700 may employ temporal multiplexing for each barrier display 710, 730. Specifically, in one embodiment, multiple spatially offset barrier patterns are projected in short sequence with the respective light field content 760 on the emissive primitive to achieve higher perceived spatial resolution and brightness.

In one specific implementation of the display assembly 700, both projectors 712, 732 and displays 710, 730 may have a native resolution of at least about 1920×1080 with pixel spacing of approximately 0.27 mm or less. The parallax barrier 716, 736 and the emissive plane 714, 734 may be spaced apart a distance, $d_{spacing}$, of less than about 10 mm. The spacing between the parallax barrier slits may be between about 9 and 12 pixels for one frame and may be adjusted according to the displayed scene. Three consecutive frames were used in one implementation for temporal multiplexing, which resulted in perceived parallax barrier spacing of 3 to 4 pixels. The corresponding 9 to 12 views of each parallax barrier on modulating devices 716, 736 consequently could be used to achieve a field of view of about 7 to about 9.5 degrees. The virtual distances between the two parallax barrier displays 710, 730 was about 100 mm and about 200 mm, respectively, in one useful implementation.

FIG. 8 illustrates another display assembly 800 that uses temporal multiplexing, and it typically would include a controller to decompose an input light field and synchronize operation of the various components to achieve such temporal multiplexing (such as the computer control system 750 of FIG. 7). The assembly 800 is shown to include a projector 812 that selectively projects or outputs decomposed and/or other portions of an input light field as shown at 813. The assembly 800 then selectively uses stacked emitting devices 815, 816, 817 of an emissive assembly 814 to selectively emit these light field components, and the emitted light is then modulated with modulating device 820 to provide a display or output 821 that is visible by viewer 825 (e.g., a 3D display is perceived by an observer 825 without use of special 3D glasses). Again, the projector 812 may be replaced by (or simply thought of as) any emissive device, and, in some cases, the projector 812 may take the form of a transparent OLED or the like.

In this second display assembly 800, temporal multiplexing is used. In one implementation of assembly 800, multiple switchable scattering PDLCD planes 815, 816, 817 are combined with a projector 812. These planes 815, 816, 817 are quickly switched (e.g., via control signals from a computer control system) between scattering and clear, while the synchronized projector 812 displays 813 different images on different layers 815, 816, 817. If the switching time is fast enough, these planes 815, 816, 817 appear to be both transparent and light emitting. In addition to the scattering planes 815, 816, 817, the assembly 800 includes a single modulator plane 820 at the front of the display assembly 800, and the modulator 820 performs two functions. First, it creates an auto-multiscopic display (e.g., a parallax barrier layer) with the nearest emitting plane 817. Second, it occludes desired parts of objects on all the emitting planes 815, 816, and 817.

In one particular implementation of the assembly 800, the projector 812 was chosen so as to have a native resolution of at least about 1024×768, and the modulating LCD 820 operated at a resolution of at least about 1920×1080. In this implementation, the layers 815, 816, 817 took the form of three PDLCDs that were spaced at 4 mm, 10 mm, and 16 mm from the modulating device 820. The modulating LCD 820 and the closest PDLCD 817 were used (by the controller) as an auto-multiscopic layer to create 12 views in a 10 degree field of view, while the other PDLCDs 815, 816 were used (by the controller) as volumetric layers only.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As described above, embodiments of the multi-layer plenoptic displays or display assemblies/systems of the present invention combine multiple emissive and light modulating planes (or display elements/components) to increase the depth range and resolution when compared with typical parallax barrier-type displays or volumetric displays. A multi-layer hardware prototype was fabricated and used by the inventors to test the concepts described herein. The results showed that traditional volumetric displays can be useful in showing the image content on multiple layers without the need for special glasses. However, foreground or images in planes more proximate to the viewer are additively blended indicating volumetric displays cannot properly handle occlusions (e.g., in the prototype an object in "front" of another object was additively blended rather than occluding the back/distal object). In the prototype, a modulating plane (or modulating display element or modulator) was added in front of the display, and this resolved occlusions perfectly for one view. But, it is understood that these occlusions often will not be correct for other views (e.g., provides no view-independent occlusion).

To address this issue, an exemplary multi-layer plenoptic display assembly taught herein (and built in the hardware prototype) is configured and operated to display an occlusion pattern in a plane that eliminates incorrect additive blending in a certain field of view (e.g., provided no view-dependent occlusion). Use of such a display element to display this occlusion pattern is beneficial but, without more, the display assembly may provide occlusion with many holes and incorrect occlusion cues as well. Hence, many preferred embodiments of the multi-layer plenoptic display assembly will also include and selectively operate a parallax barrier element or device (e.g., a barrier layer or plane). The parallax barrier element is operated (caused to display a particular and changeable parallax barrier) to fill in the view dependent occlusions and also to render view dependent effects such as specularities. The adding of this light field rendering provided a significant improvement over prior autostereoscopic displays including improved resolution and an enhanced depth range.

We claim:

1. An autostereoscopic display method, comprising:
with a computer, receiving an input light field describing a three dimensional scene;
with a decomposition program running on the computer, extracting diffuse components from the input light field including determining depths of each of the extracted diffuse components within the input light field;
determining a nearest one among emitting elements in a multi-layer plenoptic display assembly for each of the extracted diffuse components based on a comparison of the determined depths of each of the extracted diffuse components with predefined locations of the emitting elements within the multi-layer plenoptic display assembly and assigning each of the extracted diffuse components to the determined nearest one of the emitting elements;
operating the emitting elements to display the assigned ones of the extracted diffuse components,
wherein the extracted diffuse components are view-independent components of the input light field, and
wherein the method further includes displaying view-independent components of the input light field on a combination of the emitting elements and one or more modulating layers in the multi-layer plenoptic display assembly;
for every residual ray remaining after the extracting of the diffuse component, identifying occluders in the input light field and assigning each of the occluders to a modulating element in the multi-layer plenoptic display assembly; and
distributing partially visible rays among the residual rays to the emitting elements for display.

2. The method of claim 1, wherein the multi-layer plenoptic display assembly comprises at least two of the emitting elements.

3. The method of claim 2, wherein the emitting elements each comprise an array of point light sources to which the extracted diffuse components are mapped to perform the operating.

4. An autostereoscopic display method, comprising:
with a computer, receiving an input light field describing a three dimensional scene;
with a decomposition program running on the computer, extracting diffuse components from the input light field including determining depths of each of the extracted diffuse components within the input light field;
determining a nearest one among emitting elements in a multi-layer plenoptic display assembly for each of the extracted diffuse components based on a comparison of the determined depths of each of the extracted diffuse components with predefined locations of the emitting elements within the multi-layer plenoptic display assembly and assigning each of the extracted diffuse components to the determined nearest one of the emitting elements;
operating the emitting elements to display the assigned ones of the extracted diffuse components, wherein the extracted diffuse components are view-independent components of the input light field and wherein the method further includes displaying view-independent components of the input light field on a combination of the emitting elements and modulating layers in the multi-layer plenoptic display assembly;
for every residual ray remaining after the extracting of the diffuse component, identifying occluders in the input light field and assigning each of the occluders to a modulating element in the multi-layer plenoptic display assembly; and
identifying and then filling empty spaces in continuous surfaces and adjusting specular highlights in the residual rays to be at a same depth as a counterpart one among the extracted diffuse components.

5. The method of claim 4, wherein the multi-layer plenoptic display assembly comprises at least two of the emitting elements.

6. The method of claim 5, wherein the emitting elements each comprise an array of point light sources to which the extracted diffuse components are mapped to perform the operating.

7. An autostereoscopic display method, comprising:
receiving an input light field describing a three dimensional scene;
extracting diffuse components from the input light field;
determining a nearest one among emitting elements in a multi-layer plenoptic display assembly for each of the extracted diffuse components by comparing a determined depth of each of the extracted diffused components with a planar depth of the emitting elements and assigning each of the extracted diffuse components to the determined nearest one of the emitting elements;
operating the emitting elements to display the assigned ones of the extracted diffuse components, wherein the extracted diffuse components are view-independent components of the input light field and wherein the method further includes displaying view-independent components of the input light field on a combination of the emitting elements and modulating layers in the multi-layer plenoptic display assembly;
for every residual ray remaining after the extracting of the diffuse component, identifying occluders in the input light field and assigning each of the occluders to a modulating element in the multi-layer plenoptic display assembly; and
distributing partially visible rays among the residual rays to the emitting elements for display.

8. The method of claim 7, wherein the multi-layer plenoptic display assembly comprises at least two of the emitting elements.

9. The method of claim 8, wherein the emitting elements each comprise an array of point light sources to which the extracted diffuse components are mapped to perform the operating.

10. An autostereoscopic display method, comprising:
receiving an input light field describing a three dimensional scene;
extracting diffuse components from the input light field;
determining a nearest one among emitting elements in a multi-layer plenoptic display assembly for each of the extracted diffuse components by comparing a determined depth of each of the extracted diffused components with a planar depth of the emitting elements and assigning each of the extracted diffuse components to the determined nearest one of the emitting elements;
operating the emitting elements to display the assigned ones of the extracted diffuse components, wherein the extracted diffuse components are view-independent components of the input light field and wherein the method further includes displaying view-independent components of the input light field on a combination of the emitting elements and modulating layers in the multi-layer plenoptic display assembly;

for every residual ray remaining after the extracting of the diffuse component, identifying occluders in the input light field and assigning each of the occluders to a modulating element in the multi-layer plenoptic display assembly; and identifying and then filling empty spaces in continuous surfaces and adjusting specular highlights in the residual rays to be at a same depth a counterpart one among the extracted diffuse components.

11. The method of claim 10, wherein the multi-layer plenoptic display assembly comprises at least two of the emitting elements.

12. The method of claim 11, wherein the emitting elements each comprise an array of point light sources to which the extracted diffuse components are mapped to perform the operating.

13. An automultiscopic display method, comprising:
displaying, with a planar light modulating device, parallax barrier patterns;
selectively operating first and second planar emitting devices to emit received light;
operating the first and second planar emitting devices to display first and second components of a light field, wherein the light field comprises a 3D content file; and
operating the modulating device to occlude a portion of the light field,
wherein the first and second components of the light field correspond to images that are at first and second depths within the light field,
wherein the first and second emitting devices are spaced apart in parallel planes whereby the first and second components are displayed in spaced apart parallel planes, and
wherein the first component includes view-dependent components extracted from the light field and the parallax barrier pattern is generated to mask view-dependent occlusions in the light field, whereby portions of the first component are blocked by the modulating device.

14. The method of claim 13, further including operating an additional light modulating device to display parallax barrier patterns.

15. The method of claim 14, wherein the modulating devices are configured to be opaque or transparent at an array of spatial positions to display the parallax barrier patterns.

16. The method of claim 15, wherein the modulating devices each comprises an LCD monitor.

17. The method of claim 13, wherein the first and second planar emitting devices comprise an array of point light sources programmable by the controller to selectively display the first and second components of the light field.

18. The method of claim 17, wherein the first and second planar emitting devices each comprises liquid crystal display (LCD) monitors.

19. The method of claim 17, wherein the first and second components comprise view independent components extracted from the light field.

* * * * *

UNITED STATES PATENT AND TRADEMARK OFFICE
CERTIFICATE OF CORRECTION

PATENT NO. : 9,791,706 B2  
APPLICATION NO. : 14/151543  
DATED : October 17, 2017  
INVENTOR(S) : Ranieri et al.

Page 1 of 1

It is certified that error appears in the above-identified patent and that said Letters Patent is hereby corrected as shown below:

On the Title Page

Item (54) and in the Specification, Column 1, Lines 1-3, delete "MUTLI-LAYER PLENOPTIC DISPLAYS THAT COMBINE MULTIPLE EMISSIVE AND LIGHT MODULATING PLANES" and insert therefor --MULTI-LAYER PLENOPTIC DISPLAYS THAT COMBINE MULTIPLE EMISSIVE AND LIGHT MODULATING PLANES--.

Signed and Sealed this  
Tenth Day of July, 2018

Andrei Iancu  
*Director of the United States Patent and Trademark Office*